United States Patent

Ogihara et al.

[11] Patent Number: 5,598,399
[45] Date of Patent: Jan. 28, 1997

[54] MAGNETO-OPTICAL RECORDING MEDIUM HAVING MULTIPLE MAGNETIC LAYERS FOR MAGNETO-OPTICAL RECORDING MEDIUM

[75] Inventors: Noriyuki Ogihara, Abiko; Yoshinori Shirai, Kitasouma-gun; Takehiko Yorozu, Toride, all of Japan

[73] Assignee: Hitachi Maxell, Ltd., Osaka, Japan

[21] Appl. No.: 518,889

[22] Filed: Aug. 24, 1995

[30] Foreign Application Priority Data

Aug. 24, 1994 [JP] Japan .................. 6-222417
Jun. 20, 1995 [JP] Japan .................. 7-176554

[51] Int. Cl.$^6$ .............. G11B 7/24; G11B 11/00
[52] U.S. Cl. ............ 369/275.2; 369/13; 428/694 ML
[58] Field of Search .................. 369/13, 275.2, 369/14, 110; 360/59, 114; 365/122; 428/694 ML, 694 EC, 694 MM, 611, 900

[56] References Cited

U.S. PATENT DOCUMENTS 5,153,868  10/1992  Fujinaga .................. 369/13
5,225,289  7/1993  Kobayashi .................. 428/611
5,418,076  5/1995  Shiratori .................. 369/13
5,481,410  1/1996  Osato et al. .................. 369/13

FOREIGN PATENT DOCUMENTS

2-27546  1/1995  Japan .

Primary Examiner—Georgia Y. Epps
Assistant Examiner—Tan Dinh
Attorney, Agent, or Firm—Birch, Stewart, Kolasch & Birch, LLP

[57] ABSTRACT

A magneto-optic recording medium comprises on a substrate the first dielectric substance layer, a magneto-optic recording layer, the second dielectric substance layer and a reflective layer. The magneto-optic recording layer has, in the range of the Curie temperature Tc to (Tc-50) °C., a value of a product of a saturated magnetization Ms and a coercive force Hc of not more than $4 \times 10^4$ erg/cm$^3$. The magneto-optic recording medium can be recorded at a magnetic field as low as 100 (Oe) with an excellent C/N.

14 Claims, 7 Drawing Sheets

MAGNETO-OPTICAL RECORDING MEDIUM HAVING MULTIPLE MAGNETIC LAYERS FOR MAGNETO-OPTICAL RECORDING MEDIUM

FIELD OF THE INVENTION

The present invention relates to a magneto-optic recording medium. More specifically, the present invention relates to the magneto-optic recording medium for recording information signals on a recording layer by irradiating a laser beam under low external magnetic fields.

DESCRIPTION OF THE RELATED ART

In recent years, various types of optical information recording media have been available. Among them, a rewritable optical recording medium, such as a magneto-optic recording disc (MO), has been developed extensively. The magneto-optic recording medium has a typical structure in which the first dielectric substance layer, a magneto-optic recording layer composed by an amorphous alloy such as rare earth metals-transition metals alloy, the second dielectric substance layer and a reflective layer are successively formed on a transparent substrate such as polycarbonate. When recording on the magneto-optic recording medium, a recording area of the magneto-optic recording layer is locally heated to the Curie temperature by irradiating it with a laser beam while an external magnetic field is applied so that the direction of magnetization is reversed in accordance with the direction of the magnetic field. In order to achieve effective recording and erasing the magneto-optic recording medium, magnetic fields in the range of approximately 200 to 400 (Oe) have been required.

There is a demand on small-sizing and energy-saving of a drive head for the magneto-optic disk. As one of method for coping with this demand, it is desirable to develop a magneto-optic recording medium which can be recorded and erased under a lower magnetic field than the above-mentioned value. Particularly, in a magnetic field modulation recording system, a magneto-optic recording medium having enough magnetic field sensitivity under magnetic fields as low as 100 (Oe) is desirable, because the intensity of the applied magnetic field decreases with an increase of modulation frequency of recording signals.

SUMMARY OF THE INVENTION

It is an object of the invention to provide a magneto-optic recording medium which is recordable and erasable under magnetic fields as low as 100 (Oe).

It is another object of the invention to provide a magneto-optic recording medium which has an excellent Carrier to Noise (C/N) ratio even though signals are recorded under low magnetic fields of not more than 100 (Oe).

According to an aspect of the present invention, a magneto-optic recording medium comprising a magneto-optic recording layer on a substrate, said magneto-optic recording layer having, in the range of the Curie temperature Tc to (Tc-50) °C., a value of a product of a saturated magnetization Ms and a coercive force Hc of not more than $4 \times 10^4$ erg/cm$^3$.

The term "domain wall coercivity" means herein a value of a magnetic field at which a magnetization of an initial magnetization curve becomes saturated in a magnetization-magnetic field hysteresis loop.

When the product (Ms×Hc) of the saturated magnetization Ms and the coercive force Hc is not more than $4 \times 10^4$ erg/cm$^3$, good recording and erasing under low magnetic fields such as less than 100 (Oe) can be achieved. The product (Ms×Hc) of the saturated magnetization Ms and the coercive force Hc is preferably not more than $2 \times 10^4$ erg/cm$^3$ with that temperature range. It is preferred that the magneto-optic recording layer has, in the range of the Curie temperature Tc to (Tc-50) °C., a value of a domain wall coercivity of less than 1.0 KOe. Particularly, the value of the domain wall coercivity is preferably less than 0.5 KOe in that temperature range. A compensation temperature Tcom of the magneto-optic recording material of the magneto-optic recording medium is preferably 80° C. less than the Curie temperature Tc, and is preferably higher than an ambient temperature.

Figure 3:
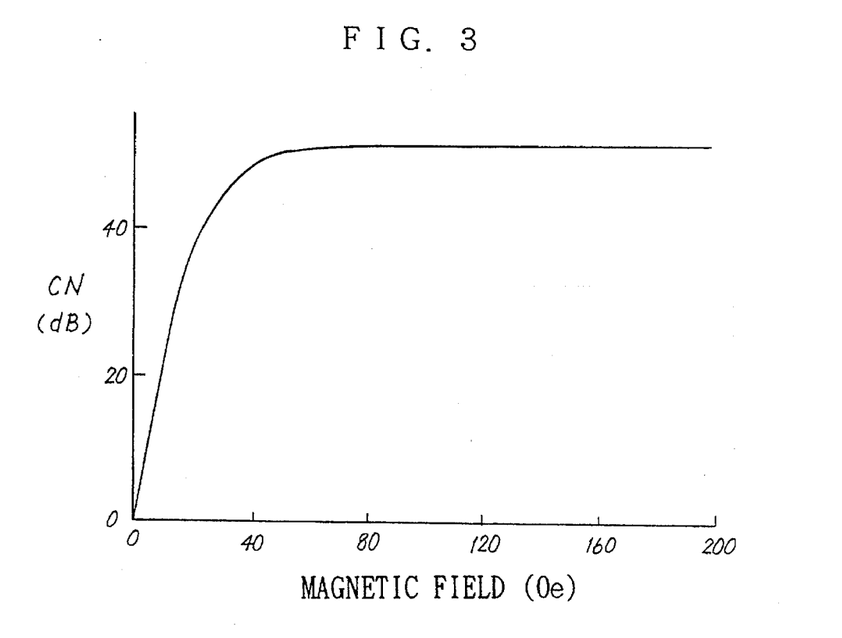
FIG. 3 illustrates a graph showing a relationship of a C/N ratio with a recording magnetic field on the magneto-optic disc of example 1.

FIG. 3 illustrates a relationship of C/N ratio with recording magnetic field on the magneto-optic disc according to the present invention. As can be seen from FIG. 3, the C/N ratio has been maximized or saturated at magnetic fields as low as about 50 (Oe). On the contrary, in FIG. 11 a conventional magneto-optic recording media requires a magnetic field of about 250 (Oe) for recording with the maximized C/N ratio.

Figure 12A:
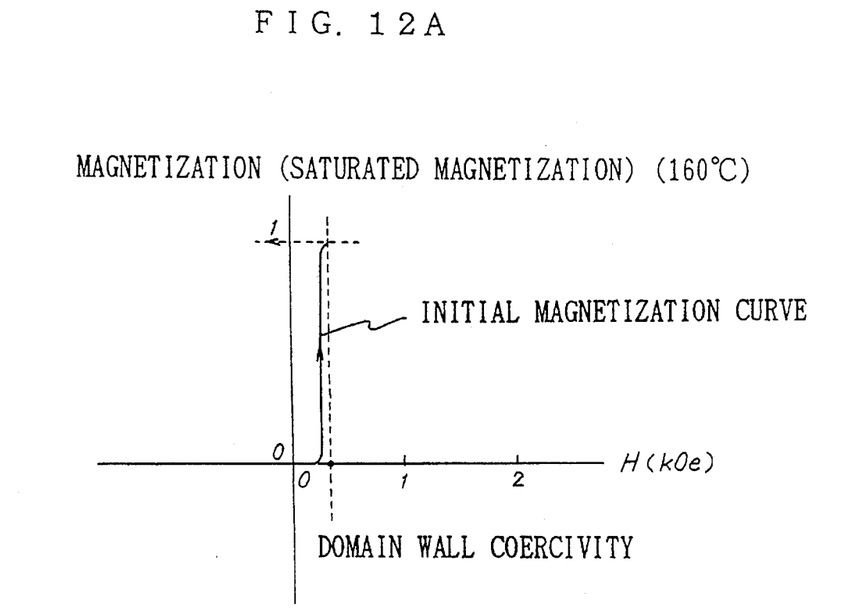
FIG. 12A illustrates an initial magnetization curve in a magnetization-magnetic filed hysteresis curve at 160° C. on the magneto-optic disc of example 1
Figure 12B:
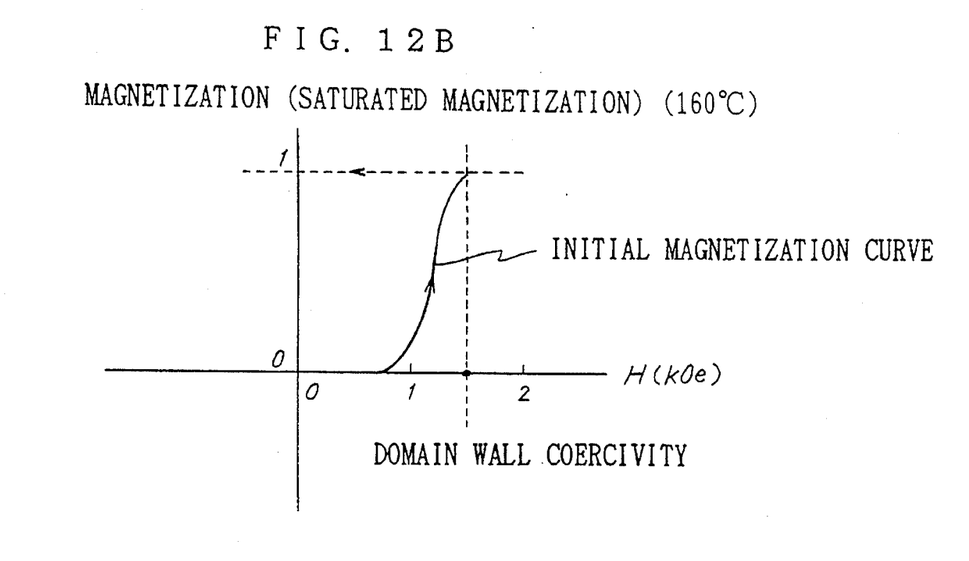
FIG. 12B illustrates an initial magnetization curve in a magnetization-magnetic filed hysteresis curve at 160° C. on the magneto-optic disc of the comparative example.

FIGS. 12A and 12B show initial magnetization curves in a magnetization-magnetic field hysteresis loop on the magneto-optic disc according to the present invention and the conventional magneto-optic disc respectively. It can be seen that the magneto-optic disc of the present invention has a domain wall coercivity of less than 1.0 KOe and its rising slope of an initial magnetization curve is very sharp (FIG. 12A). It is believed that the difference in the profile of two curves affect the C/N ratio of the signals.

The magneto-optic recording medium of the invention may comprises on a substrate the first dielectric substance layer, a magneto-optic recording layer, a second dielectric substance layer and a reflective layer.

DETAILED DESCRIPTION OF THE PREFERRED EMBODIMENT

Magneto-optic recording medium is recorded by locally heating a surface of the magneto-optic recording layer to reduce the coercive force Hc by irradiating it with a laser beam while applying an external magnetic field thereto, so that magnetization is reversed toward a polarity of the magnetic field. The difficulty of reverse of magnetization depends on the magnitude of the coercive force Hc of the magneto-optic recording material in a temperature range near the Curie temperature Tc of the material. In addition, magnetic domains can be formed more easily by the external magnetic field when the value of a saturated magnetization Ms becomes small in that temperature range. Therefore, temperature characteristics of the coercive force Hc and the saturated magnetization Ms of the magneto-optic recording media can influence with a magnitude of magnetic field applied in recording and a C/N ratio.

In the present invention, magneto-optic recording under low magnetic fields such as 50 (Oe) could have been achieved by using a magneto-optic recording medium which has specific values of the product of Ms and Hc in the certain temperature range. The magneto-optic recording medium shows a particular shape of a magnetization-magnetic field hysteresis loop wherein a rising slope of an initial magnetization curve is very sharp.

The magneto-optic recording medium according to the present invention may comprise the first dielectric substance layer, a magneto-optic recording layer, the second dielectric substance layer and a reflective layer on a substrate. The magneto-optic recording layer is characterized by having the value of the product of Ms and Hc of not more than $4 \times 10^4$ $erg/cm^3$ in the range of Curie temperature Tc to (Tc-50) °C. There are various techniques to prepare such magneto-optic recording layer having the specific value of the product Ms and Hc. As one of these techniques, the magneto-optic recording layer may be comprised of two magnetic layers so as to obtain the value of Ms×Hc. In accordance with examples of the present invention, it is preferred that the magneto-optic recording layer is comprised of the first magnetic layer TbFeCo and the second magnetic layer TbFeCoNb. The thickness of the first magnetic layer is preferably within the range of 200 to 230 Å and the thickness of the second magnetic layer is preferably within the range of 30 to 50 Å.

Another method of attaining the above value of the product Ms×Hc is by choosing the specific components and composition of the magneto-optic recording material. A TbGdFeCo alloy, particularly, the TbGdFeCo alloy with Gd/Tb ratio being 0.1–0.3, is preferred as a magneto-optic recording material. A TbFeCoPt alloy, particularly, the TbFeCoPt alloy containing Pt of 5–10 atm %, is also preferred as a magneto-optic recording material.

When the magneto-optic recording layer is formed by sputtering, the sputtering condition like sputtering gas, gas pressure, bias voltage etc, can be arranged so as to provide the above-mentioned values of the product Ms and Hc being not more than $4 \times 10^4$ $erg/cm^3$ in the range of Curie temperature Tc to (Tc-50) °C.

After forming the first dielectric substance layer and before the step of forming the magneto-optic recording layer, etching the surface of the first dielectric substance layer with Ar+ ions in the sputtering apparatus also can be provide the above-mentioned value of the product Ms and Hc in that temperature range.

Furthermore, another method of attaining the above value of the product Ms×Hc is to anneal the magneto-optic recording medium. It is believed that the annealing causes a reduction of the magneto-anisotropy energy. However, annealing a produced magneto-optic recording medium at high temperatures results in a damage of a polycarbonate substrate. Thus, the substrate may be heated at relatively low temperatures like up to 120° C. for annealing while the magneto-optic recording layer being formed by, for example, sputtering.

The saturated magnetization Ms and the coercive force Hc can be easily observed by using a device which can measure an electromagnetic induction electro motive force based on a vibration sampling method to obtain a magnetization-magnetic field hysteresis curve. Therefore, in order to obtain the desired value of the product of Ms and Hc, the values of the product of Ms and Hc can be arranged while observing these values each time after one of these factors, such as composition of the magneto-optic recording material, the condition of sputtering, or the annealing temperature, is changed. Either Ms or Hc may be changed, or both Ms and Hc may be changed. Although the value of domain wall coercivity tends to change by the arrangement of the product of Ms and Hc, the value of domain wall coercivity can be adjusted to not more than 1.0 KOe by controlling partial pressure ratio of sputtering gas or etching treatment of the surface of the first dielectric substance layer with Ar+ ions in the sputtering apparatus after forming the first dielectric substance layer. The domain wall coercivity can be measured by describing an initial magnetization curve of the magnetization-magnetic field curve.

In the magneto-optic recording medium, a compensation temperature Tcom of the magneto-optic recording material is preferably 80° C. less than the Curie temperature Tc in order to ensure perpendicular magnetic anisotropy of the magneto-optic recording layer. Also, it is preferable to set the compensation temperature Tcom higher than the ambient temperature in order to stabilize magnetic domains against an external magnetic field. The compensation temperature can be arranged by, for example, changing a ratio of rare-earth elements and transition metals when the magneto-optic recording film is formed by an alloy composed by rare-earth elements and transition metals.

The magneto-optic recording medium of the invention is suitable for a magnetic field modulation recording system wherein a magnetic field generated by a magnet tends to decrease at a higher modulation frequency.

The invention is illustrated in more detailed by reference to the following examples, but is not limited to them.

EXAMPLE 1

In this example, a magneto-optic (MO) disc having a magneto-optic recording layer consisting of two magnetic layers is manufactured. In the first stage, an injection molding technique was used to manufacture a polycarbonate substrate, upon which pre-pits, such as address pits, and a pre-groove for guiding a recording and reproducing light spot were formed. This substrate had a diameter of 86 mm and a thickness of 1.2 mm. An ultraviolet ray curing resin was coated on one side of the substrate to which a recording beam is irradiated. This substrate was dried for three hours in a vacuum dryer at a temperature of 80° C. and a pressure of $10^{-3}$ Pa. Then, five films (layers) were sequentially formed on the substrate using a sequential sputtering device which has a plurality of film forming chambers according to the following procedure. The substrate was furnished in the first chamber in which a SiN target is used as a sputtering target and a mixed gas of Ar/N$_2$ was used as sputtering gas at a pressure of 0.2 Pa. The obtained SiN film had a thickness of 200 Å. The substrate was conveyed by a tray into the second film forming chamber in which a TbFeCo alloy target was used as a sputtering target and an Ar gas was used as a sputtering gas at a pressure of 0.2 Pa. The first magnetic film of $Tb_{24.5}Fe_{66.5}Co_9$ with a thickness of 200 Å was formed on the SiN layer. In the third film forming chamber, a TbFeCoNb alloy target was used as a sputtering target in an Ar gas at a pressure of 0.2 Pa. As a result of the sputtering, $Tb_{20}Fe_{66}Co_{12}Nb_2$ film with a thickness of 50 Å was formed as the second magnetic film on the first magnetic layer. In the forth film forming chamber, SiN film with 200 Å was formed in the same manner used in the first film forming chamber. Then the substrate was conveyed into the fifth film forming chamber and AlTi$_3$ reflective film with a thickness of 500 Å was formed using an AlTi$_3$ sputtering target. After the substrate was removed from the sequential sputtering device, an UV curing resin was coated on the top of the laminated substitute. In the step of forming the second magnetic layer, the composition of the TbFeCoNb alloy target was arranged so that the Curie temperature of the second magnetic layer was same as that of the first magnetic layer.

Figure 1:
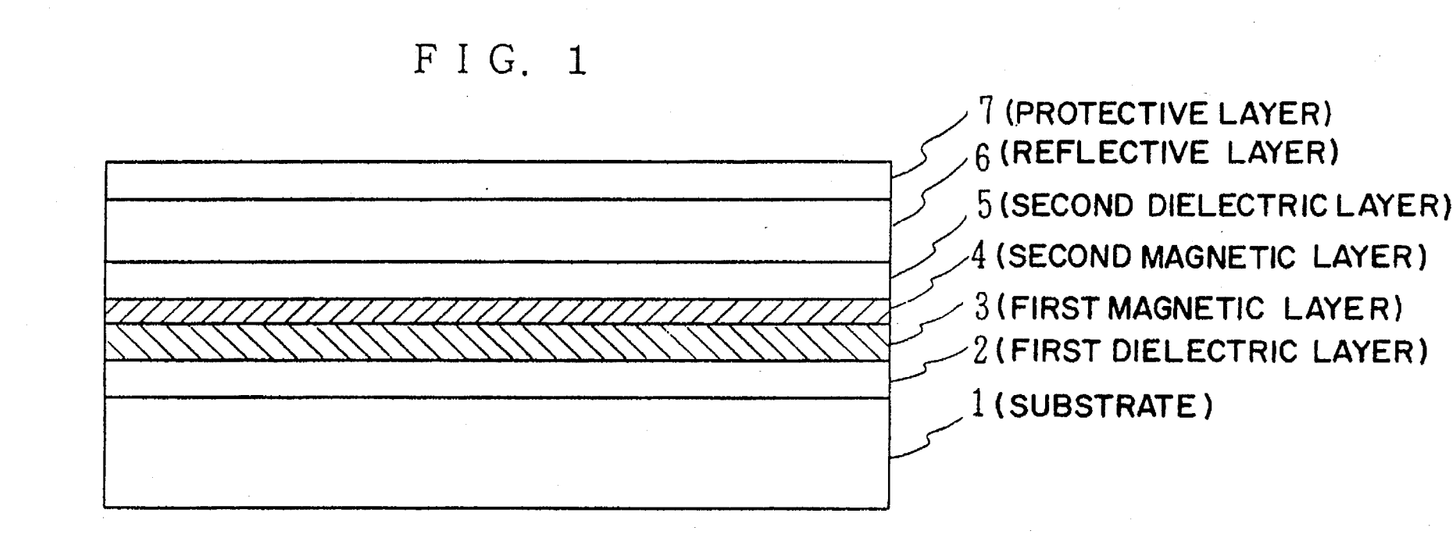
FIG. 1 illustrates a cross sectional view of a magneto-optic disc manufactured in example 1.

FIG. 1 shows a cross sectional view of the obtained magneto-optic disc. This magneto-optic disc had the first dielectric substance layer 2 of SiN, the first magnetic layer 3 of $Tb_{24.5}Fe_{66.5}Co_9$, the second magnetic layer 4 of $Tb_{20}Fe_{66}Co_{12}Nb_2$, the dielectric substance layer 5 of SiN, the reflective layer 6 of AlTi$_3$ and protective layer 7 of the UV curing resin on the polycarbonate substrate 1. In the above step for forming the first and the second dielectric substance layers, SiO target may be used for SiN target, and Ar/O$_2$ mixed gas may be used for Ar/N$_2$ mixed gas.

Figure 2:
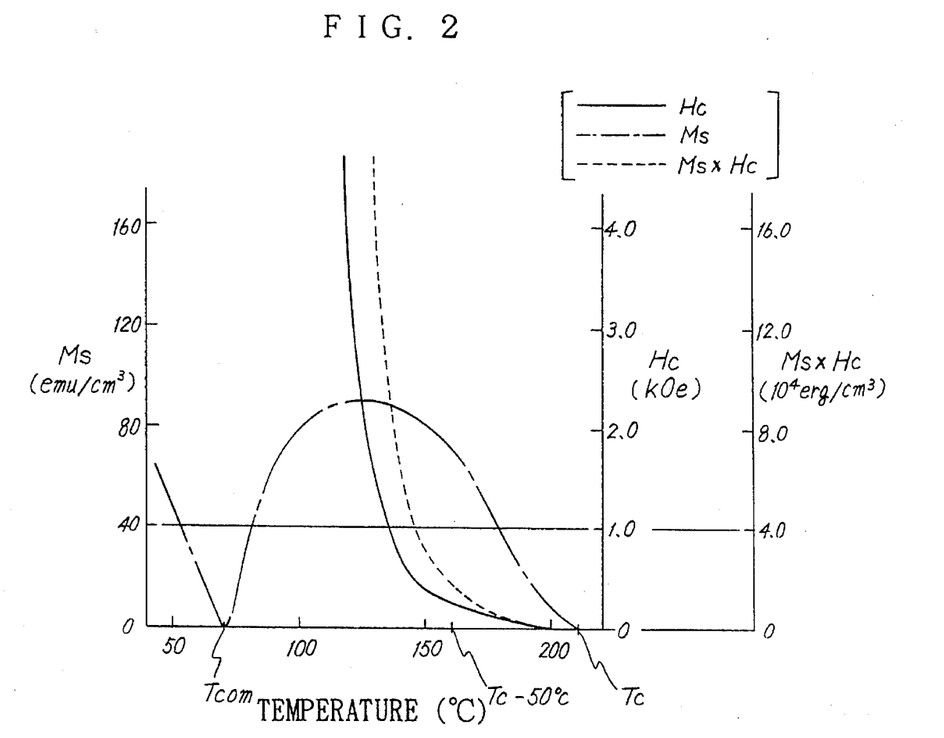
FIG. 2 illustrates a graph showing a temperature dependency of a coercive force Hc, a saturated magnetization Ms, the product Hc×Ms of the magneto-optic disc manufactured in example 1.

A coercive force Hc and a saturated magnetization Ms of the magneto-optic recording layer of the obtained magneto-optic disc were measured at various temperatures. The coercive force Hc and the saturated magnetization Ms were measured by describing a magnetization-magnetic field curve based on vibration sampling method while changing temperatures. FIG. 2 shows the results of the measurement on Hc and Ms. A Curie temperature Tc of the magneto-optic recording layer was 210° C. A compensation temperature Tcom was 90° C. which was higher than room temperatures. The product of Hc and Ms was about $1.9\times10^4$ erg/cm$^3$ at a temperature of 160° C. which was 50 Å less than the Curie temperature Tc. FIG. 12A shows an initial magnetization curve in magnetization-magnetic filed hysteresis loop at 160 Å on the magneto-optic recording layer. The domain wall coercivity was 0.35 KOe.

Sample signals were recorded on the obtained magneto-optic disc by applying various magnetic field under a magnetic field modulation recording system at a duty ratio of 50%, a recording frequency of 5.85 MHz, a linear velocity of 7.5 m/s and a recording light power of 6 mW. The recorded signals were reproduced under a regenerating light power of 1.5 mW. The C/N ratio was measured for each signal which was recorded under respective magnetic field intensity. FIG. 3 shows that the value of the C/N ratio changes depending on the recording magnetic intensity. As can be seen in FIG. 3, the C/N ratio become maximum or saturated at a low magnetic intensity of about 50 (Oe). There is a possibility that the recorded information or formed magnetic domains deteriorate due to a relatively high temperature in reproduction. However, in the present invention, this deterioration could be avoided because of the compensation temperature Tcom being higher than room temperatures.

EXAMPLE 2

A magneto-optic disc was manufactured in the same manner as example 1 except that the thickness of $Tb_{24.5}Fe_{66.5}Co_9$ film was 220 Å and the thickness of $Tb_{20}Fe_{66}Co_{12}Nb_2$ film was 30 Å.

Figure 4:
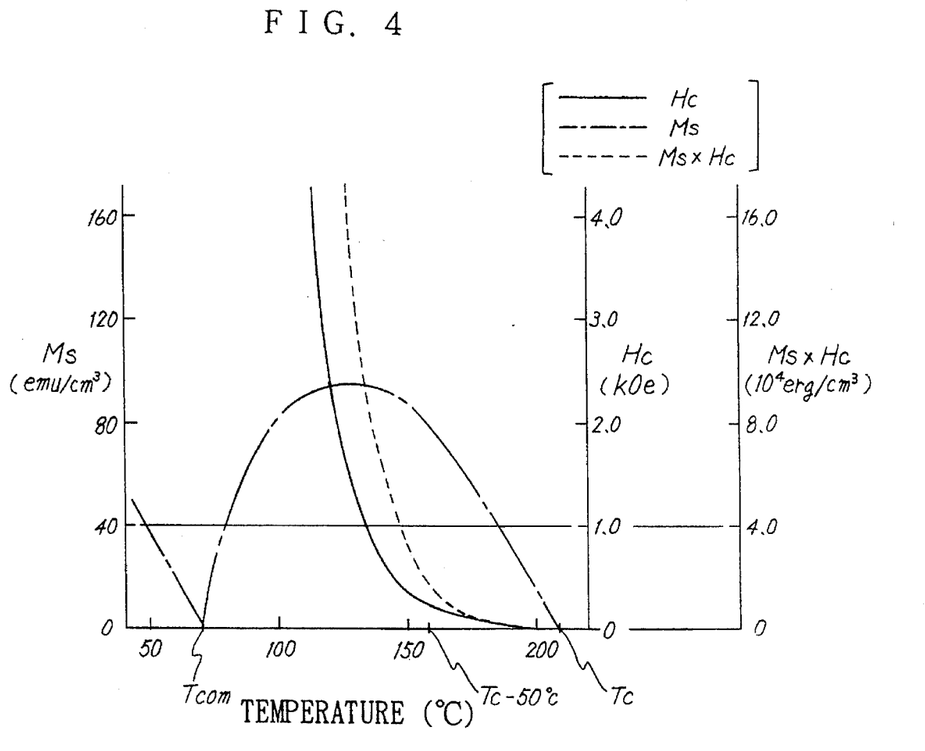
FIG. 4 illustrates a graph showing a temperature dependency of a coercive force Hc, a saturated magnetization Ms, the product Hc×Ms of the magneto-optic disc manufactured in example 2.

A coercive force Hc and a saturated magnetization Ms of the magneto-optic recording layer of the obtained magneto-optic disc were measured at various temperatures. FIG. 4 shows the results of the measurement on Hc and Ms. A Curie temperature Tc of the magneto-optic recording layer was 210° C. A compensation temperature Tcom was 80° C. which was higher than room temperatures. The product of Hc and Ms was about $1.8\times10^4$ $^{erg/cm3}$ at a temperature of 160° C. which was 50° C. less than the Curie temperature Tc.

Figure 5:
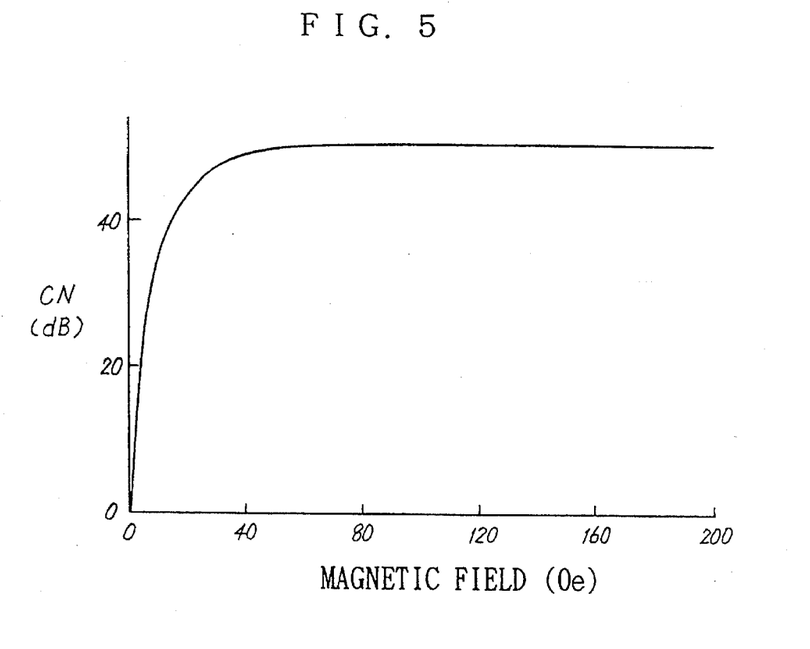
FIG. 5 illustrates a graph showing a relationship of a C/N ratio with a recording magnetic field on the magneto-optic disc of example 2.

Sample signals were recorded on the obtained magneto-optic disc by applying various magnetic fields under a magnetic field modulation recording system in the same condition as example 1. The recorded signals were reproduced in the same condition as example 1. The C/N ratio was measured for the each signal which was recorded under respective recording magnetic field intensity. FIG. 5 shows that the value of the C/N ratio changes depending on the recording magnetic intensity. As can be seen in FIG. 5, the C/N ratio becomes maximum or saturated at a magnetic intensity as low as about 50 (Oe).

COMPARATIVE EXAMPLE

A magneto-optic disc was manufactured in the same manner as example 1 except that only one magnetic layer of $Tb_{25.5}Fe_{62.5}Co_{12}$ with a thickness of 250 Å was formed as the magneto-optic recording layer.

Figure 10:
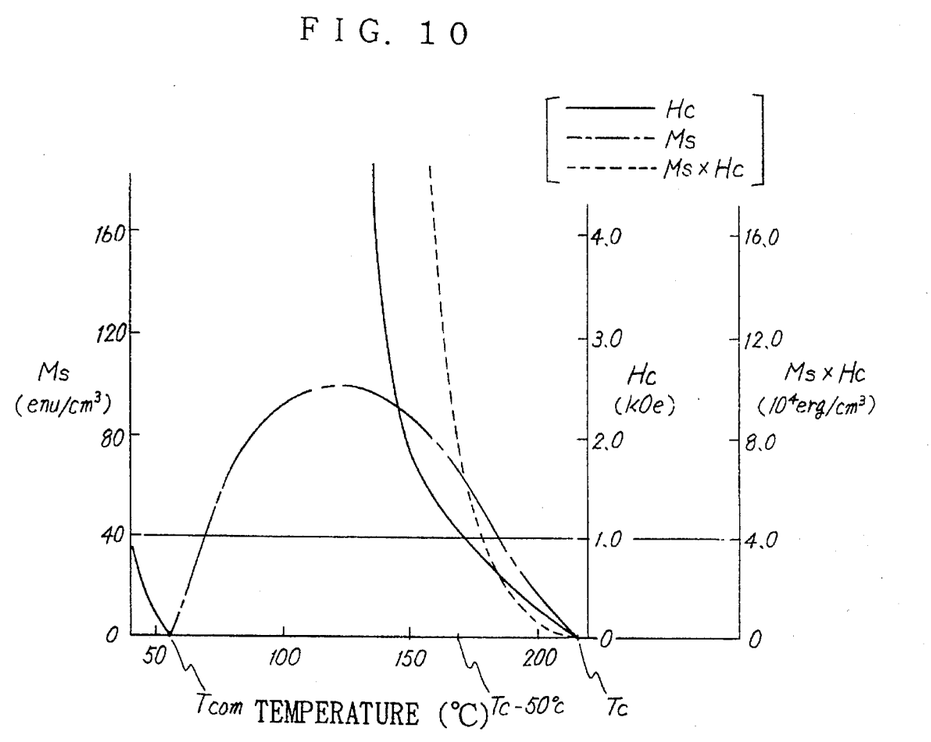
FIG. 10 illustrates a graph showing a temperature dependency of a coercive force Hc, a saturated magnetization Ms, the product Hc×Ms of the magneto-optic disc manufactured in the comparative example.

A coercive force Hc and a saturated magnetization Ms of the magneto-optic recording layer of the obtained magneto-optic disc were measured at various temperatures. FIG. 10 shows the results of the measurement on Hc and Ms. A Curie temperature Tc of the magneto-optic recording layer was 220° C. A compensation temperature Tcom was 100° C., which was higher than room temperatures. The product of Hc and Ms was about $7.0\times10^4$ erg/cm$^3$ at a temperature of 170° C., which was 50° C. less than the Curie temperature Tc.

Figure 11:
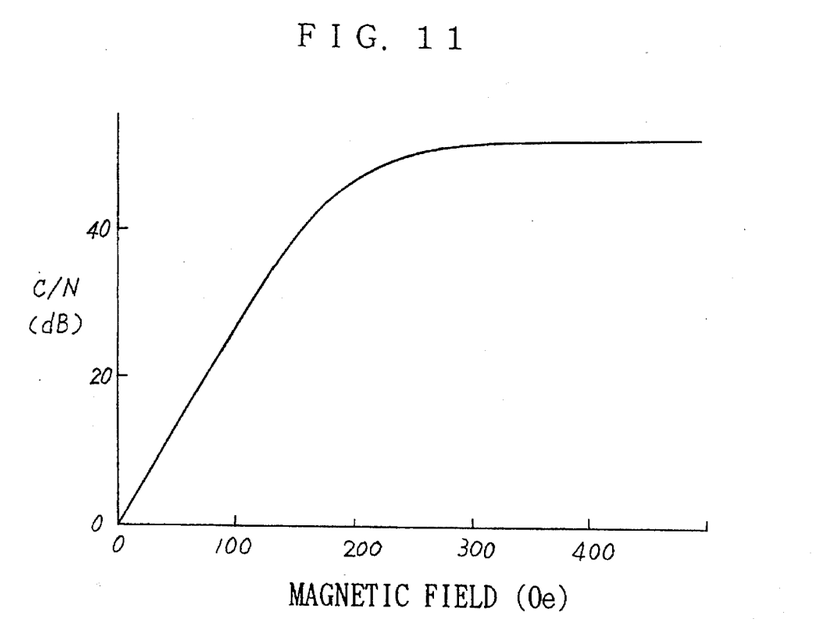
FIG. 11 illustrates a graph showing a relationship of a C/N ratio with a recording magnetic field on the magneto-optic disc of the comparative example. The C/N ratio is saturated at a recording magnetic field of about 250 (Oe).

Sample signals were recorded on the obtained magneto-optic disc by applying various magnetic fields under a magnetic field modulation recording system in the same condition as example 1. The recorded signals were reproduced in the same condition as example 1. The C/N ratio was measured for each signal which was recorded under respective recording magnetic field intensity. FIG. 11 shows that the value of the C/N ratio changes depending on the recording magnetic intensity. As can be seen in FIG. 11, the C/N ratio becomes maximum, or saturated, at a magnetic field intensity of about 250 (Oe) which is much higher than in the magneto-optic disc of examples 1 and 2.

EXAMPLE 3

In this example, a magneto-optic (MO) disc having a magneto-optic recording layer consisting of one magnetic layer was manufactured. A magneto-optic disc was manufactured in the same manner as example 1 except that the magneto-optic recording layer was formed by using a $Tb_{24}Fe_{67}Co_9$ target at an Ar pressure of 0.2 Pa, sputtering power of 2.5 kW and a bias voltage of 0 V. The bias voltage applied to the substrate usually shows plus several hundreds voltages as a self-bias due to the Ar+ ions. In this example, however, a compensation voltage was applied to the substrate so as to adjust the bias voltage to 0 V. The formed magneto-optic recording layer had a thickness of 250 Å.

Figure 6:
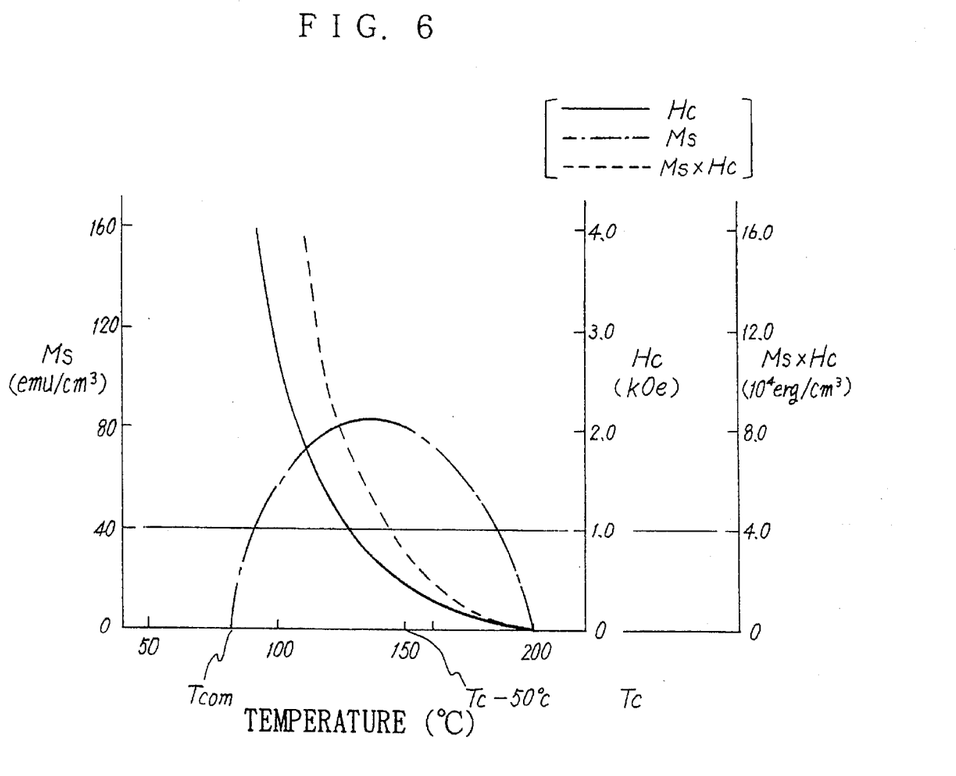
FIG. 6 illustrates a graph showing a temperature dependency of a coercive force Hc, a saturated magnetization Ms, the product Hc×Ms of the magneto-optic disc manufactured in example 3.

A coercive force Hc and a saturated magnetization Ms of the magneto-optic recording layer of the obtained magneto-optic disc were measured at various temperatures in the same manner as the Example 1. FIG. 6 shows the results of the measurement on Hc and Ms. A Curie temperature Tc of the magneto-optic recording layer was 200° C. A compensation temperature Tcom was 80° C. which was higher than room temperatures. The product of Hc and Ms was about $3.5 \times 10^4$ erg/cm$^3$ at a temperature of 150° C. which was 50° C. less than the Curie temperature Tc. The domain wall coercivity was 0.60 KOe.

Figure 7:
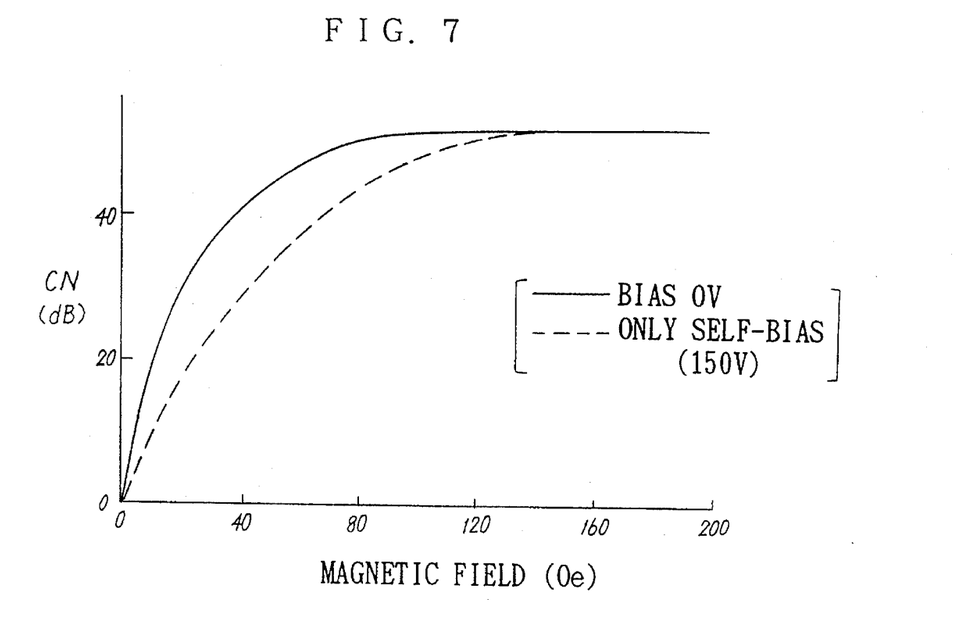
FIG. 7 illustrates a graph showing a relationship of a C/N ratio with a recording magnetic field on the magneto-optic disc of example 3.

Sample signals were recorded on the obtained magneto-optic disc by applying various magnetic fields in the same condition as example 1. The recorded signals were reproduced in the same condition as example 1. The C/N ratio was measured for the each signal which was recorded under respective magnetic field intensity. FIG. 7 shows that the value of the C/N ratio changes depending on the recording magnetic intensity. A continuous line shows the result on the disc of which the recording layer was formed by a bias voltage of 0 V while a break line shows the result on the disc of which the recording layer was formed at a self-bias of 150 V without the compensation voltage. As can be seen in FIG. 7, the C/N ratio becomes maximum or saturated at a magnetic intensity as low as about 90 (Oe) when the compensation voltage was applied.

EXAMPLE 4

A magneto-optic disc was manufactured in the same manner as example 3 except that the magneto-optic recording layer was formed while heating the substrate by a lamp heater without applying the compensation voltage. The radiation continued for 90 seconds, immediately after the substrate was conveyed into the sputtering apparatus, including the sputtering period. A temperature sensor showed that the highest temperature of the substrate was about 80° C.

Figure 8:
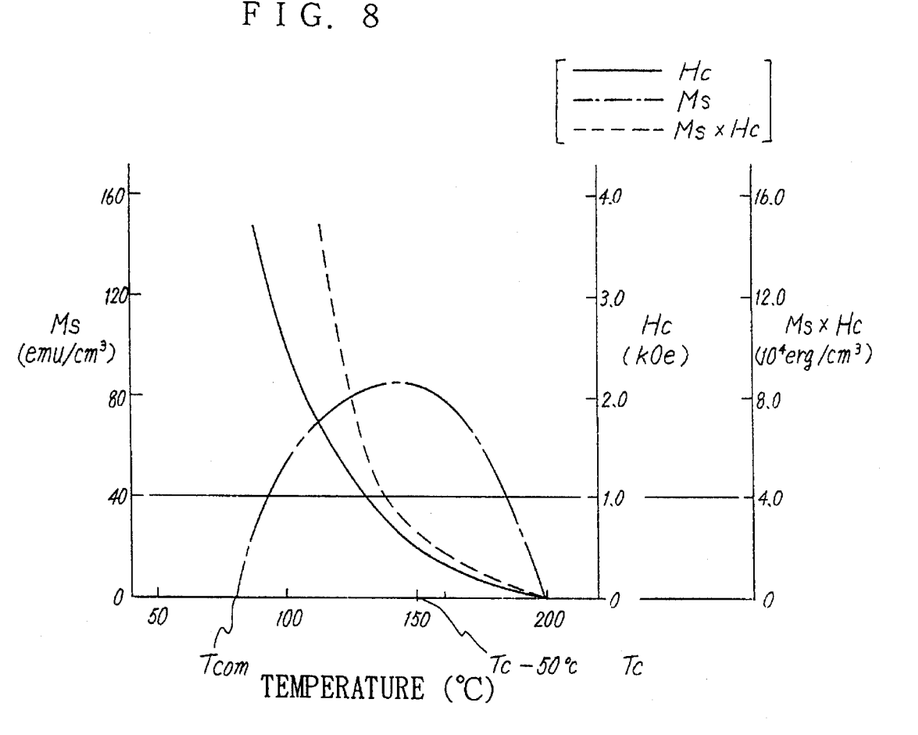
FIG. 8 illustrates a graph showing a temperature dependency of a coercive force Hc, a saturated magnetization Ms, the product Hc×Ms of the magneto-optic disc manufactured in example 4.

A coercive force Hc and a saturated magnetization Ms of the magneto-optic recording layer of the obtained magneto-optic disc were measured at various temperatures in the same manner as the Example 1. FIG. 8 shows the results of the measurement of Hc and Ms. A Curie temperature Tc of the magneto-optic recording layer was 200° C. A compensation temperature Tcom was 80° C. which was higher than room temperatures. The product of Hc and Ms was about $2.4 \times 10^4$ erg/cm$^3$ at a temperature of 150° C. which was 50° C. less than the Curie temperature Tc. From an initial magnetization curve of hysteresis loop, the domain wall coercivity was 0.50 KOe.

Figure 9:
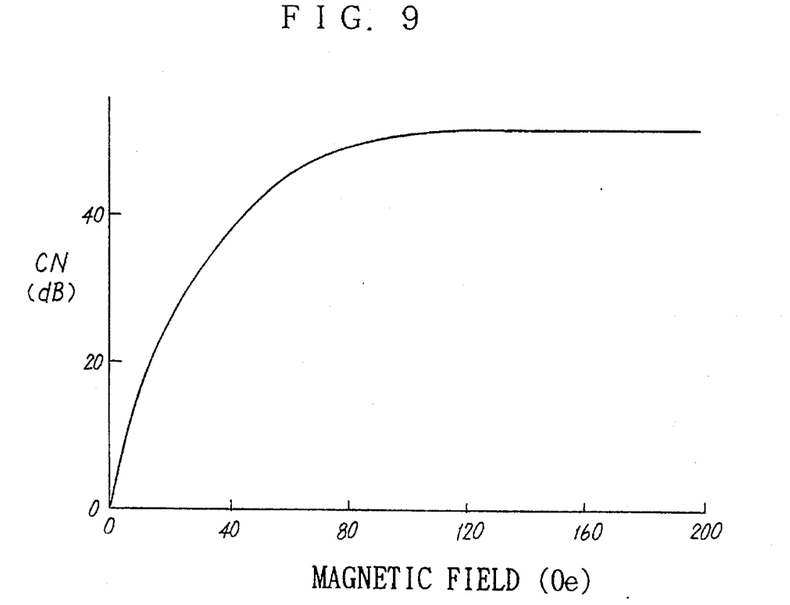
FIG. 9 illustrates a graph showing a relationship of a C/N ratio with a recording magnetic field on the magneto-optic disc of example 4.

Sample signals were recorded on the obtained magneto-optic disc by applying various recording magnetic fields in the same condition as example 1. The recorded signals were reproduced in the same condition as example 1. The C/N ratio was measured for the each signal which was recorded under respective magnetic field intensity. FIG. 9 shows that the value of the C/N ratio change depending on the recording magnetic intensity. As can be seen in FIG. 9, the C/N ratio becomes maximum or saturated at a magnetic intensity as low as about 60 (Oe).

The reason the magneto-optic recording medium according to the present invention can be recorded and erased under low recording magnetic fields of less than 100 (Oe) is not clear. It can be believed that, in case of the magneto-optic disc of example 1, an anisotropic energy of the magneto-optic recording layer become low around the Curie temperature. This promotes a nucleation of the reverse of magnetization of TbFeCo layer. In the above examples, domain wall coercivity energy decreases due to decrease of an anisotropic energy or the exchange coefficient, resulting in excellent response of the domain wall coercivity to the magnetic field. In general, when an anisotropic energy is small at elevated temperatures, shapes of recorded magnetic domains are likely to be irregular. However, because, in the present invention, a compensation temperature Tcom is positioned higher than room temperatures, the irregularity can be eliminated. Namely, the shape of recorded magnetic domains can be kept regular by having the large coercive force Hc and pinning site, which is a portion preventing a movement of domain wall, in the range of room temperatures to the temperature of 50° C. less than the Curie temperature Tc.

As discussed in the above description, the magneto-optic recording medium of the present invention can be recorded and erased under lower magnetic fields conventional magneto-optic recording media. Accordingly, the magneto-optic recording medium of the invention is suitable for a magnetic field modulation recording system, in which polarity of the magnetic field is switched quickly. Also, the magneto-optic recording medium of the invention contributes to small-sizing and energy-saving of a recording device for a magneto-optic disc.

The present invention may be embodied in other specific forms without departing from the spirit or essential characteristics thereof. The present examples are therefore to be considered in all respects as illustrative and not restrictive, the scope of the invention being indicated by appended claims rather than by the foregoing description and all changes which come within the meaning and range of equivalency of the claims are therefore intended to be embraced therein.

What is claimed is:

1. A magneto-optic recording medium comprising a magneto-optic recording layer on a substrate, said magneto-optic recording layer having, in the range of the Curie temperature Tc to (Tc-50) °C., a value of a product of a saturated magnetization Ms and a coercive force Hc of not more than $4\times10^4$ erg/cm$^3$.

2. A magneto-optic recording medium according to claim 1, said magneto-optic recording layer having, in the range of the Curie temperature Tc to (Tc-50) °C., a value of a domain wall coercivity of not more than 1.0 KOe.

3. A magneto-optic recording medium according to claim 1, said value of product (Ms×Hc) of the saturated magnetization Ms and the coercive force Hc is not more than $2\times10^4$ erg/cm$^3$.

4. A magneto-optic recording medium according to claim 1, said value of the domain wall coercivity is not more than 0.5 KOe.

5. A magneto-optic recording medium according to claim 1, wherein said magneto-optic recording layer comprises a magneto-optical material that possesses a compensation temperature Tcom that is 80° C. less than the Curie temperature Tc.

6. A magneto-optic recording medium according to claim 1, wherein said magneto-optic recording layer comprises a magneto-optical recording material that possesses a compensation temperature Tcom that is higher than ambient temperatures.

7. A magneto-optic recording medium according to claim 1, wherein said magneto-optic recording layer is comprised of a first magnetic layer of TbFeCo and a second magnetic layer of TbFeCoNb.

8. A magneto-optic recording medium according to claim 7, the thickness of the first magnetic layer is within the range of 200 to 230 Å and the thickness of the second magnetic layer is within the range of 30 to 50 Å.

9. A magneto-optic recording medium according to claim 1, said magneto-optic recording layer is comprised of a magnetic layer of TbFeCo which was formed by sputtering while the substrate was being heated.

10. A magneto-optic recording medium according to claim 9, the heating temperature of the substrate is within the range of 80° C. to 120° C.

11. A magneto-optic recording medium according to claim 1, the magneto-optic recording medium is recorded and regenerated under a magnetic field modulation recording system.

12. A magneto-optic recording medium according to claim 1, the magneto-optic recording medium is recordable at magnetic fields of not more than 100 (Oe).

13. A magneto-optic recording medium comprising on a substrate the first dielectric substance layer, a magneto-optic recording layer, the second dielectric substance layer and a reflective layer, said magneto-optic recording layer having, in the range of the Curie temperature Tc to (Tc-50) °C., a value of a product of a saturated magnetization Ms and a coercive force Hc of not more than $4\times10^{4\ erg/cm3}$.

14. A magneto-optic recording medium according to claim 13, the magneto-optic recording medium is recordable at magnetic fields of not more than 100 (Oe).

* * * * *